US011509968B2

(12) United States Patent
Petrov et al.

(10) Patent No.: US 11,509,968 B2
(45) Date of Patent: Nov. 22, 2022

(54) METHOD AND SYSTEM FOR SORTING VIRTUAL CARDS IN A GAMING ENVIRONMENT

(71) Applicant: Evolution Malta Limited, Sliema (MT)

(72) Inventors: Ivan Petrov, Riga (LV); Anton Stepanov, Riga (LV); Ineta Bucena, Riga (LV)

(73) Assignee: Evolution Malta Limited, Sliema (MT)

( * ) Notice: Subject to any disclaimer, the term of this patent is extended or adjusted under 35 U.S.C. 154(b) by 0 days.

(21) Appl. No.: 17/165,434

(22) Filed: Feb. 2, 2021

(65) Prior Publication Data

US 2021/0243500 A1 Aug. 5, 2021

(30) Foreign Application Priority Data

Feb. 3, 2020 (EP) .................................... 20155144

(51) Int. Cl.
| | | |
|---|---|---|
| *H04N 21/478* | (2011.01) | |
| *A63F 13/537* | (2014.01) | |
| *A63F 1/06* | (2006.01) | |
| *A63F 13/822* | (2014.01) | |
| *G06F 7/58* | (2006.01) | |

(52) U.S. Cl.
CPC ........... *H04N 21/4781* (2013.01); *A63F 1/06* (2013.01); *A63F 13/537* (2014.09); *A63F 13/822* (2014.09); *G06F 7/588* (2013.01)

(58) Field of Classification Search
None
See application file for complete search history.

(56) References Cited

U.S. PATENT DOCUMENTS

| | | | |
|---|---|---|---|
| 10,217,314 B2* | 2/2019 | Thomas | G07F 17/34 |
| 10,953,311 B2* | 3/2021 | Abrahamson | G07C 15/006 |
| 2004/0251628 A1 | 12/2004 | Kilby | |
| 2006/0121977 A1 | 6/2006 | Odom | |
| 2012/0094737 A1 | 4/2012 | Barclay | |

(Continued)

FOREIGN PATENT DOCUMENTS

WO 2016065116 A1 4/2016

OTHER PUBLICATIONS

European Patent Office. Extended European Search Report for application 20155144.7 dated Aug. 10, 2020. 13 pages.

*Primary Examiner* — Ronald Laneau
(74) *Attorney, Agent, or Firm* — Quarles & Brady LLP (57) ABSTRACT

Systems and methods for controlling a graphical user interface in a live-game environment are disclosed. The systems and methods comprise obtaining a signal indicative of an output of a Hardware Random Number Generator (HRNG). The output of the HRNG comprising a symbol (e.g. an integer) within a predefined set comprising a plurality M of unique symbols (e.g. 1-75). Further comprising providing a graphical user interface on a display of a remote electronic device, where the graphical user interface comprising a graphical representation having a live video stream (or video feed) of at least the output of the HRNG, and a plurality of graphical elements, each graphical element defining or embodying a virtual card. Further comprising identifying the symbol of the output of the HRNG, determining a virtual card score for each virtual card of the plurality of virtual cards based on the identified symbol, and updating the graphical representation.

15 Claims, 3 Drawing Sheets

(56) References Cited

U.S. PATENT DOCUMENTS

| | | |
|---|---|---|
| 2012/0122539 A1 | 5/2012 | Khal |
| 2012/0322530 A1 | 12/2012 | Moore |
| 2013/0196761 A1 | 8/2013 | Doorgeest |
| 2016/0101347 A1* | 4/2016 | Merati .................. G07F 17/322 463/16 |
| 2018/0130282 A1 | 5/2018 | Cire |

* cited by examiner

METHOD AND SYSTEM FOR SORTING VIRTUAL CARDS IN A GAMING ENVIRONMENT

CROSS-REFERENCE TO RELATED APPLICATIONS

This application claims priority to European Patent Application No. EP 20155144.7 filed Feb. 3, 2020, the disclosure of which is incorporated herein by reference in its entirety and for all purposes.

TECHNICAL FIELD

The present disclosure relates to methods and systems for sorting virtual cards based on card score and expected outcome of a Hardware Random Number Generator.

BACKGROUND ART

Random Number Generators (RNGs) are devices that generate a sequence of numbers or symbols that cannot be reasonably predicted better than by random chance. Hardware Random Number Generators (HRNGs), which are sometimes referred to as True Random Number Generators (TRNGs), are devices that generate random numbers from a physical process rather than by means of an algorithm. Moreover, these devices are often based on microscopic phenomena such as e.g. thermal noise, photoelectric effect, or some other quantum phenomena. These types of "quantum-based" HRNGs typically include an amplifier to bring the output of the physical process to the macroscopic realm.

However, the present disclosure pertains to macroscopic HRNGs, i.e. HRNGs built from random macroscopic processes such as e.g. dice, physical roulette wheels, lottery machines, and bingo machines. Even though macroscopic processes are deterministic under Newtonian mechanics, the output of a well-designed device like a roulette wheel cannot be predicted in practice, because it depends on the sensitive, micro-details of the initial conditions of each use. Thus, in the present context, the output of such "macroscopic" HRNGs are considered to be unpredictable.

Bingo is a well-known game of chance where each player is supposed to match numbers printed in different arrangements on cards which the numbers the game host (sometimes referred to as caller) draws at random, marking the called-out numbers on the cards. When a player finds that the called-out numbers are arranged in a row, column, or diagonal (assuming that the numbers on each card are laid out in square matrices), they call out "Bingo!" to alert other participants to a winning card. Conventionally, the bingo cards have numbers pre-arranged in a table, grid, matrix, or array, generally referred to as faces, to make a predetermined winning pattern. Generally the cards have a 5×5 matrix with randomly distributed unique numbers ranging from 1-75.

Even though bingo is strictly a game of chance, a player may increase his or her chance for winning through the simultaneous playing a plurality of cards in each game. However, for conventional bingo games this requires rapid perception of the called-out number, rapid eye movements over the field of ten cards or more, marking each card, analysing each card to see if the number produces a win according to the rules of the particular game, and announcing a win, if it occurs. As a remedy to this, a number of developments, mainly in the form of virtual representations of a bingo card, have been made which attempt to aid the player or simulate the game in such a way that the player merely becomes a passive participant. Thus, it has proven to be hard to provide a solution that aids the player without completely taking over the game by machine.

Moreover, with the increasing popularity of online casino games, there is an increasing need in the art for improvements in the art, and in particular in terms of providing solutions which aid players that want to play with large numbers of cards (excess of 20 cards) but without completely taking over the game. Game designers are constantly looking for ways to provide games that are exciting to the player so to retain the player's interest and desire to play the game. In particular, there is a need for new and improved user interfaces for online bingo games which relieve some of the cognitive burden for players while maintaining the essence and excitement of the game.

SUMMARY

It is therefore an object of the present disclosure to provide a method, a corresponding computer-readable storage medium, and a system which alleviates all or at least some of the above-discussed drawbacks of presently known solutions.

In particular it is an object of the present disclosure to provide means for generating an efficient and intuitive user-interface on a display of a remote device in a live-game environment, so to alleviate some of the cognitive burden associated with fast-paced games and to reduce a number of redundant user inputs on the user device so to reduce wasted processor and battery power.

This object is achieved by means of a method, a corresponding computer-readable storage medium, and a system as defined in the appended claims. The term exemplary is in the present context to be understood as serving as an instance, example or illustration.

According to a first aspect of the present disclosure, there is provided a method for controlling a graphical user interface in a live-game environment. The method comprises obtaining a signal indicative of an output of a Hardware Random Number Generator (HRNG). The output of the HRNG comprising a symbol (e.g. an integer) within a predefined set comprising a plurality M of unique symbols (e.g. 1-75). The HRNG is configured to output one random symbol from the predefined set for each launch of the HRNG. The method further comprises providing a graphical user interface on a display of a remote electronic device, where the graphical user interface comprising a graphical representation having a live video stream (or video feed) of at least the output of the HRNG, and a plurality of graphical elements, each graphical element defining or embodying a virtual card. Each virtual card has an N×N matrix of randomly arranged unique symbols, where the symbols of each virtual card form a subset S of the symbols of the predefined set. A number of elements in the subset S is smaller than a number of elements in the predefined set M. The method further comprises, identifying the symbol of the output of the HRNG, determining a virtual card score for each virtual card of the plurality of virtual cards based on the identified symbol, and updating the graphical representation. More specifically, the graphical representation is updated by for each virtual card comprising the identified symbol, marking the identified symbol, and re-arranging a layout of the plurality of virtual cards based on the determined virtual card score so to emphasise the virtual card having the highest determined virtual card score (relative to at least one other virtual card of the plurality of virtual cards).

Hereby a method for providing an efficient and intuitive graphical user interface for a live-game application is presented. In more detail, by means of the proposed method players of for example live-casino bingo games may participate with an unprecedented amount of in-game cards without being exposed to the stress of handling large numbers of cards as in prior known solutions. The herein proposed solution offers the user with the ability follow the most important events of a bingo-game without having to manually check and follow each and every card, thereby improving the overall user experience.

According to a second aspect of the present disclosure, there is provided a (non-transitory) computer-readable storage medium storing one or more programs configured to be executed by one or more processors of a processing system, the one or more programs comprising instructions for performing the method according to any one of the preceding claims. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present disclosure, there is provided a system for controlling a graphical user interface in a live-game environment. The system comprises control circuitry configured to obtain a signal indicative of an output of a Hardware Random Number Generator (HRNG). The output of the HRNG comprising a symbol (e.g. an integer) within a predefined set comprising a plurality M of unique symbols (e.g. 1-75). The HRNG is configured to output one random symbol from the predefined set for each launch of the HRNG. Moreover, the control circuitry is configured to provide a graphical user interface on a display of a remote electronic device, where the graphical user interface comprising a graphical representation having a live video stream (or video feed) of at least the output of the HRNG, and a plurality of graphical elements, each graphical element defining or embodying a virtual card. Each virtual card has an N×N matrix of randomly arranged unique symbols, where the symbols of each virtual card form a subset S of the symbols of the predefined set. A number of elements in the subset S is smaller than a number of elements in the predefined set M. The control circuitry is further configured to identify the symbol of the output of the HRNG, determine a virtual card score for each virtual card of the plurality of virtual cards based on the identified symbol, and update the graphical representation. More specifically, the graphical representation is updated by: for each virtual card comprising the identified symbol, marking the identified symbol, and re-arranging a layout of the plurality of virtual cards based on the determined virtual card score so to emphasise the virtual card having the highest determined virtual card score (relative to at least one other virtual card of the plurality of virtual cards). With this aspect of the disclosure, similar advantages and preferred features are present as in the previously discussed aspects of the disclosure.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. In some of the illustrated embodiments the same or similar components have not all been provided with reference numerals so to avoid unnecessary cluttering of the drawings. However, such obvious considerations are readily understood and appreciated by the skilled person in the art and should not be construed as limiting to the or in any other way have a negative impact on the present disclosure.

Figure 1:
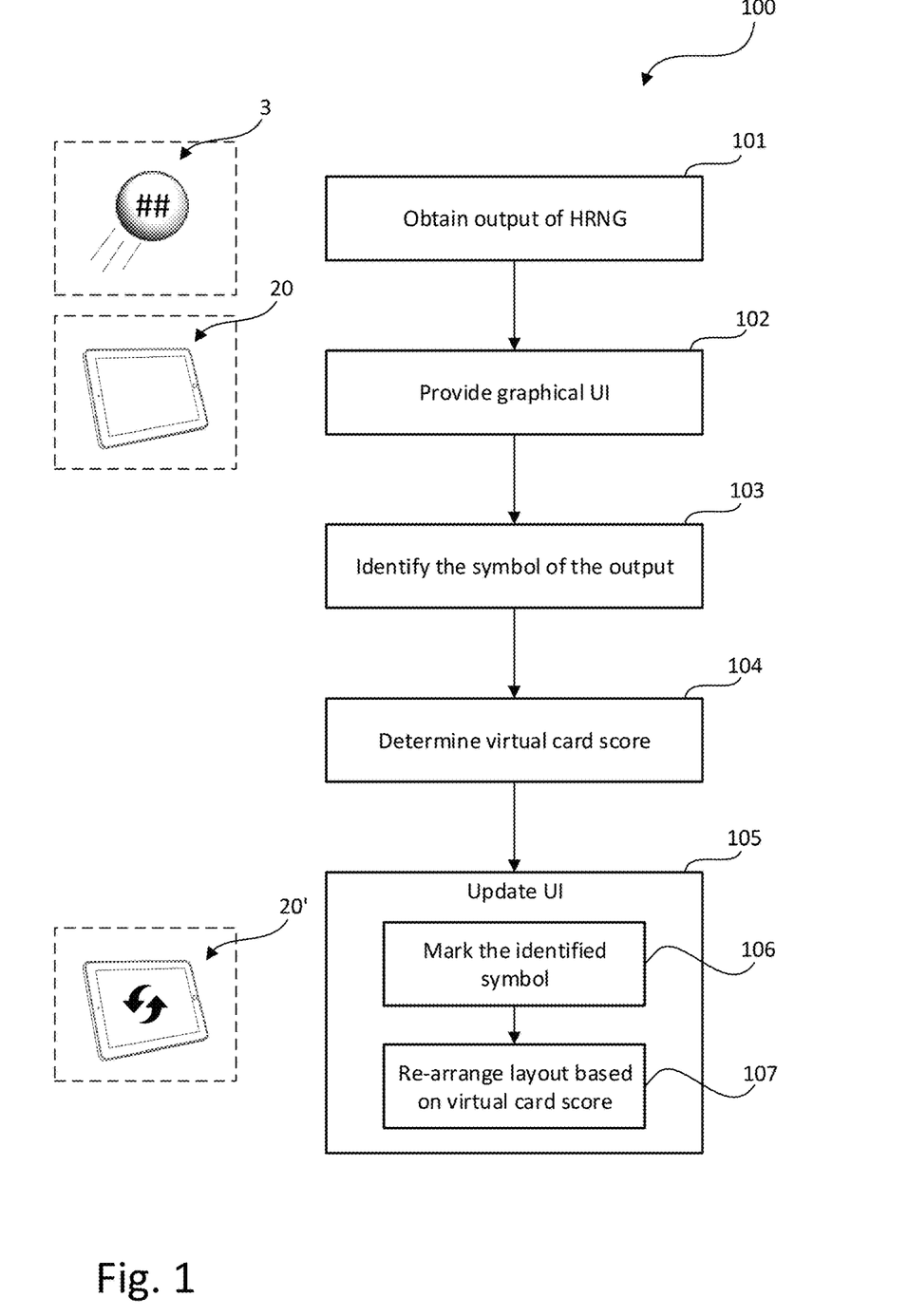
FIG. 1 is a schematic flow chart representation of a method for controlling a graphical user interface in a live-casino environment in accordance with an embodiment of the present disclosure.

FIG. 1 is a schematic flow chart representation of a method 100 for controlling and adapting a user interface in a live-casino environment in accordance with an embodiment of the present disclosure. The method 100 comprises obtaining, at an input, a signal indicative of an output 3 of a Hardware Random Number Generator (HRNG). The output 3 of the HRNG comprises a symbol within a predefined set of unique symbols. The HRNG is further configured to output one random symbol from the predefined set for each launch of the HRNG. Moreover, the HRNG is configured to generate a plurality of launches in a single game cycle such that the same symbol cannot be output more than once during the game cycle. The term obtaining is herein to be interpreted broadly and encompasses receiving, retrieving, collecting, acquiring, and so forth.

The following description will be made in reference to a HRNG in the form of an automated bingo machine generating an output 3 in the form of randomly selected balls 3, where each ball is associated with a unique integer from a predefined range of integers. Accordingly, the predefined set comprising a plurality M of unique symbols may be construed as integer values in the range from 1 to 75.

The method further comprises providing 102 a graphical user interface 20 on a display of a remote electronic device. The remote electronic device may for example be a personal computer, a smartphone, or a tablet capable of establishing a connection to a wide area network (WAN), and thereby access remote external servers. The graphical user interfaces 20 comprises a graphical representation comprising a live video stream of at least the output 3 of the bingo machine. Preferably the graphical representation comprises a live video stream of the whole bingo machine. However, as the skilled reader readily realizes the herein disclosed concept is applicable on non-live games, without any game presenter or other live-attributes or elements where the game is based on a virtual random number generator. Thus, in some embodiments the graphical representation may comprise another graphical element indicative of an output of an RNG instead of the live video stream.

The graphical representation further has a plurality of graphical elements, where each graphical elements defines a virtual card, e.g. a virtual bingo-card. Each virtual card has an N×N matrix of randomly arranged unique symbols. The symbols of each virtual card form a subset S of the symbols of the predefined set M. Accordingly, the number of elements in the subset S is smaller than the number of elements in the predefined set M. In accordance with an exemplary embodiment, each virtual card has a 5×5 matrix having a total of 25 unique and randomly arranged integers, and the predefined set comprises all integers between 1 and 75. Thus, each card has 25 integers randomly selected between 1 and 75. It should be noted that in some embodiments, the virtual cards may have one or more "joker"-symbols, i.e. free symbols that represent all symbols in the predefined set M.

Moving on, the method 100 further comprises, for each launch of the bingo machine, identifying 103 the symbol of the output 3 of the bingo machine. In other words, the method 100 comprises determining the integer associated with the "drawn" ball. Further, the method comprises determining 104 a virtual card score for each virtual card based on the identified symbol. The determining of virtual card score serves the purpose of determining which card of the plurality of cards is the most relevant for the user to pay attention to, and may be quantified in various ways that will be exemplified in reference to FIGS. 2*a*-2*c*.

Still further, the method comprises updating 105 the graphical representation 20' by marking 106 the identified 103 symbol on each virtual card comprising the identified symbol, and re-arranging 107 a layout of the plurality of virtual cards based on the determined 104 virtual card score to emphasize the virtual card having the highest determined virtual card score relative to at least one other virtual card of the plurality of cards. In other words, the graphical elements defining the virtual cards are re-arranged or re-organized 107 in accordance with their determined 104 virtual scores.

By means of the herein presented method, and in particular the card re-sorting feature, a player is provided with the possibility to play with an unprecedented amount of cards during each game cycle without impairing the excitement of the game and making the player merely a passive by-stander. Instead, the player is provided with the opportunity to focus on the most relevant cards (e.g. cards which are close to reaching a winning state or associated with large pay-outs) and thereby maintain the excitement of the game. Moreover, the herein proposed solutions improves the human-machine interaction, and further minimizes the number of interactions that the user has with the user device and thereby increases the battery life time of handheld devices. In more detail, since the user interface emphasizes the most relevant cards automatically the user is not forced to manually check and verify each individual card through interaction with the user device, which can be a herculean task for players playing with a large number of cards simultaneously (e.g. more than 40 cards). Since the need for unnecessary interaction with the user device is at least partly mitigated, the amount of gaming time for a single charge of the battery of a handheld device (e.g. a smartphone or tablet) can be increased.

In other words, the herein disclosed embodiments provide for efficient interfaces for playing an online bingo-game. While user interfaces for playing online bingo games exist, these interfaces may often be inefficient and associated with increased cognitive burden for the user. However, the techniques proposed herein can reduce the cognitive burden for a user who player online bingo-games, and in particular for users playing with large numbers of cards simultaneously, thereby increasing productivity. Further, such techniques may reduce processor and battery power otherwise wasted on redundant user inputs.

Executable instructions for performing these functions are, optionally, included in a non-transitory computer-readable storage medium or other computer program product configured for execution by one or more processors.

Figure 2A:
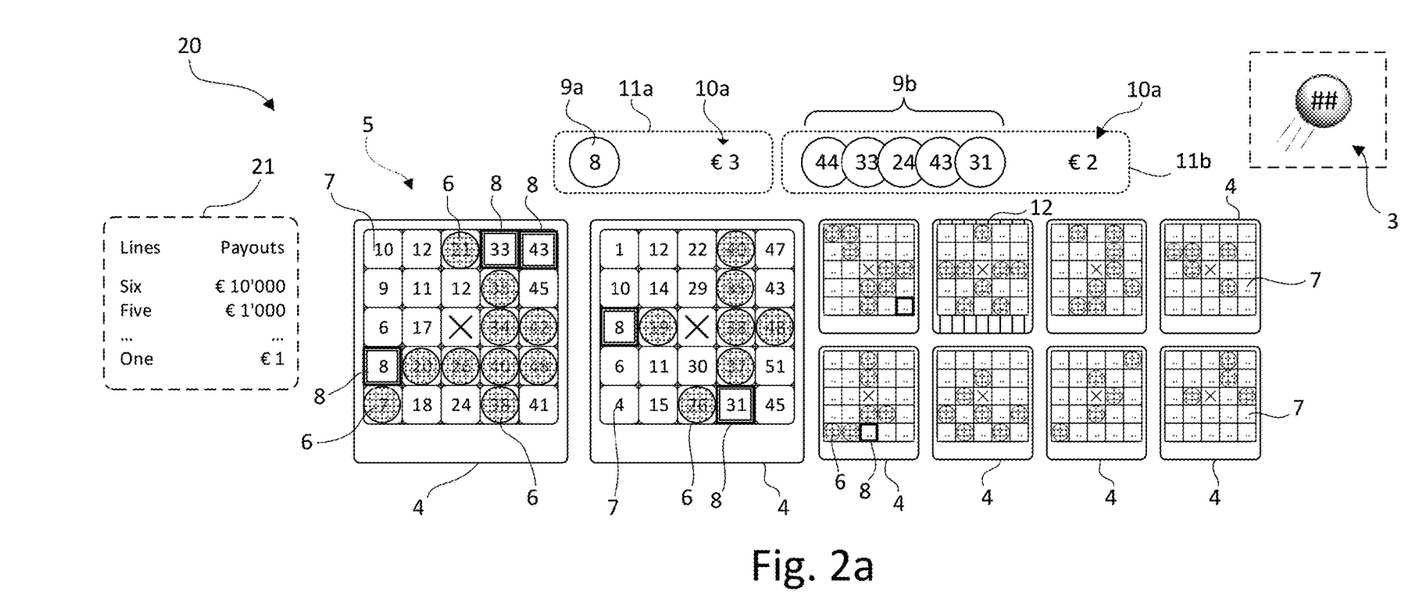
FIGS. 2a-2c are schematic illustrations of a user interface of a live-casino environment in accordance with an embodiment of the present disclosure.
Figure 2B:
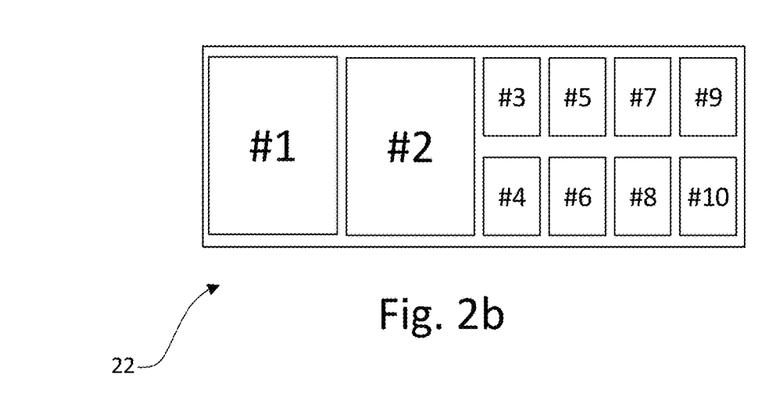
Figure 2C:
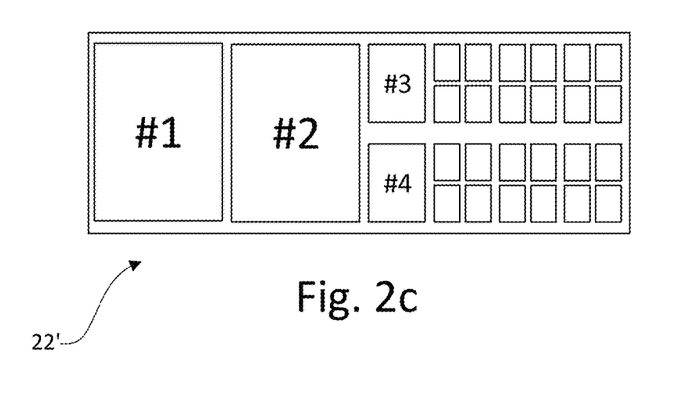

FIGS. 2*a*-2*c* are schematic illustrations of a user interface 20 in a live-casino bingo-game environment. In particular, FIGS. 2*a*-2*c* serve to elucidate the principles of the determination of a virtual card score and the re-arranging of the layout of the plurality of virtual cards based on the determined virtual card score.

In general, the game works as that a player buys one or more cards 4 containing randomly arranged unique integers 5 in order to participate in the game. During the game numbered balls 3 are drawn (i.e. an output 3 is generated by an HRNG), and corresponding numbers are marked 6 on the players virtual cards 4. A player wins if at least one line on the card has been marked 6, i.e. if a full column, a full row, or a full diagonal of marked symbols 6 is obtained. The game is further associated with a predefined pay-out scheme 21, where a higher number of marked lines results in bigger winnings.

However, a common problem for developers of online bingo-games is that it may be boring to follow the game, in particular if balls 3 are drawn slowly. The slow pace of the game provides the players with more time to check their cards 4, compare the drawn numbers, follow potential winnings or already won lines, at the cost of longer playing times to complete a game cycle and a higher risk of boring the players. As mentioned in the background section of the present application, a player may purchase a higher number of cards 4 in order to increase his or her chances of winning and add more excitement to the game, but at the cost of increasing the risk of losing track of each card and potentially missing out on several exciting anticipation parts of the game.

As a remedy to this, many existing solutions reduce the pace of the game, for example, balls 3 may be drawn down slowly, one may employ a game presenter to announce the drawn numbers 3, or one can limit the maximum number of cards 4 that a player may purchase. These remedies reduce the cognitive burden for the players has the inherent drawback of increasing game time, increasing the risk of boring the players (i.e. reduction of customer satisfaction), and more over increases the time spent for each game cycle, thereby increasing the number of unnecessary interactions between the player and the user interface 20.

By means of the therein disclosed solution it is possible to provide a game that is fast-paced while allowing the players to purchase an unprecedented amount of cards 4 for each game, thereby allowing the players to increase their chances of winning. Moreover, this is done with an efficient and intuitive user interface 20 which allows the players to follow a fast game with a high number of cards 4 without adding stress by forcing the players to constantly keep track of all of the cards 4 during the game.

Accordingly, by providing an efficient user interface 20 the players are constantly provided with a better overview of the more relevant cards 4 while the less relevant cards 4 are de-prioritized in the user interface 20. Thus, the game operates a fast and exciting pace and the players may be allowed to purchase up to 200 cards.

In the following, several examples embodiments of how the virtual card score may be determined for each virtual card 4. The virtual card score may comprise several factors or elements which may be weighted according to a specific realization. These factors may include, combinations of lines with the missing numbers 7 on each virtual card 4, card status and current pay-out value, and "potential numbers" 9a, 9b and their associated "potential pay-out" 10a, 10b.

Accordingly, the factor comprising combinations of lines with missing numbers 7 is based on a count of "un-marked" numbers on each virtual card 4. Thus, in some embodiments, the step of determining a virtual card score comprises determining a number of un-marked numbers 7 in each column, in each row, and in each diagonal for each virtual card 4. Then, the virtual card score is determined for each virtual cards based on the determined number of un-marked numbers 7 such that a lower number of un-marked numbers 7 results in a higher virtual card score. In other words, there are 12 possible win-lines on each card (five rows, five columns, and two diagonals), and the numbers of "missing" numbers 7 is summed up on each virtual card 4 such that fewer missing numbers 7 gives a higher virtual card score.

Moreover, the factor accounting for "potential numbers" 9a, 9b and their associated pay-out 10a, 10b is based on an identification of a potential pay-out 10a, 10b given that a specific number is drawn in a subsequent launch of the bingo-machine. Thus, the virtual cards 4 having that specific number are given a score based on the associated pay-out 10a, 10b for that specific number 9a, 9b, such that the highest potential win results in the highest virtual card score. Accordingly, in some embodiments, the step of determining a virtual card score comprises identifying any virtual card 4 having only one number remaining (indicated by reference numeral 8) in order to form a full column a full row, or a full diagonal of marked number 6. Each column, row, or diagonal having only one number left in order to form a full column, a full row, or a full diagonal of marked symbols 6 is defined as a "potential scoring line". Then, the virtual card score is determined for the plurality of virtual cards 4 based on a number of potential scoring lines, where a higher number of potential scoring lines renders in a higher virtual card score. The potential symbols 9a, 9b may be further provided in one or more separate graphical elements 11a, 11b on the user interface 20. In more detail, the potential symbols 9a, 9b may be grouped and displayed according to their associated pay-outs 10a, 10b. Here, the number 8 is associated with a pay-out of €3 while the numbers 44, 33, 44, 43, and 31 are associated with a pay-out of €2 and therefore shown as separate graphical elements.

Moreover, one may further calculate a number of occurrences of each identified potential number 9a, 9b in the plurality of virtual cards, and calculate a pay-out 10a, 10b associated with each identified potential number 9a, 9b based on the calculated number of occurrences of each identified potential symbol 9a, 9b and a predefined pay-out scheme 21.

In more detail, in the illustrated embodiment all of the potential numbers ("8", "44", "33", "24", "43", "31") 9a, 9b have been identified and grouped in two separate groups based on the associated potential pay-out (€2 and €3). The corresponding numbers are marked 8 on the virtual cards 4 as well. The associated potential pay-out for potential number "8" is determined to be €3, because the number "8" occurs in two different virtual cards 4 (the two left-most emphasized cards) in a first potential line (predefined pay-out scheme 21 indicates that a single line in a virtual card 4 results in a €1 pay-out) summing up to €2. Furthermore, the player has already won €1 as indicated by reference numeral 12 (one full row), therefore summing up to potential pay-out given that number "8" is drawn in a subsequent launch of the bingo-machine to €3. The remaining potential numbers 9b the associated potential pay-out is €1, which together with the already won €1 results in a potential pay-out of €2 given that any one of these potential numbers 9b are drawn in a subsequent launch of the bingo-machine.

Further, the step of updating the graphical representation of the graphical user interface 20 further comprises marking the unmarked number (as indicated by reference numeral 8) in each potential scoring line. The marking of the un-marked number in each potential scoring line is different than the marking 6 of the identified (drawn) number 3. In the illustrated example, drawn numbers 3 are marked with an overlaid circle 6 while the remaining single number in each potential scoring line is marked with a square frame 8.

Furthermore, the virtual card score may comprise a factor based on a "card status". In more detail, the step of determining a virtual card score may comprise determining a total number of full columns, full rows, and full diagonals of marked numbers 6 for each virtual card. In other words, a current pay-out is calculated for each virtual card 4 given the number of winning lines that are detected in each virtual card. Thus, the virtual card score for each virtual card is further based on the determined total number of full columns, full rows, and full diagonals of marked numbers 6. A higher total number of winning lines renders in a higher virtual card score. Thus, if a virtual card 4 already has a winning line, and further includes one or more potential lines, it will be given a relatively high virtual card score since the expected pay-out increases with the number of winning lines as defined in the predefined pay-out scheme 21.

An example of a layout 22 of the plurality of virtual cards is indicated in FIG. 2b. In more detail, the virtual cards 4 that are determined most relevant for the user/player, i.e. the virtual cards 4 associated with the highest virtual card scores are given a higher rank. These higher ranked ranks are accordingly emphasized by their position in the layout grid 22. More specifically, the virtual card 4 associated with the highest virtual card score is arranged on the #1 position, the virtual card 4 associated with the second highest virtual card score is arranged on the #2 position, and so forth. Thereby an efficient graphical representation of the user interface 20 may be provided, giving the players the most relevant information before every launch or draw of the bingo-machine.

Moreover, after every round of the game (every launch or draw of the bingo-machine) the herein described methods and systems identify new potential numbers 9a, 9b and re-calculate the virtual card scores such that the interface is up to date before every round. In other words, each time there is a change in the potential numbers 9a, 9b, associated pay-outs, card status, a new virtual card score may be determined for one more virtual cards 4 meaning that the system may conclude that there is a more "relevant" or "interesting" card for the player to follow and a better placement for that virtual card 4 is provided in the user interface 20.

Moreover, the graphical representation may be further updated by re-arranging the layout of the plurality of virtual cards 4 after a game cycle is completed (i.e. a predefined amount of numbers 3 have been drawn and the game has ended) based on the associated pay-out for each virtual card. Higher pay-outs results in a better placement in the layout 22. Thus, after the game cycle has completed the factors of the virtual card score may be given different weight so to give actual winnings a higher impact than potential winnings. Accordingly, if the game ended in the illustrated round, the card marked with reference numeral 12 would be moved to the #1 spot in the layout 22.

Even though only ten virtual cards 4 are illustrated in the embodiment of FIGS. 2a-2c, the skilled reader readily realizes that the layout grid 22 may be accordingly adapted based on the number of virtual cards 4 in play. However, preferably the size and position of the two highest ranking cards #1, #2 is maintained while the sizes of the other cards is reduced, as indicated in FIG. 2c.

Figure 3:
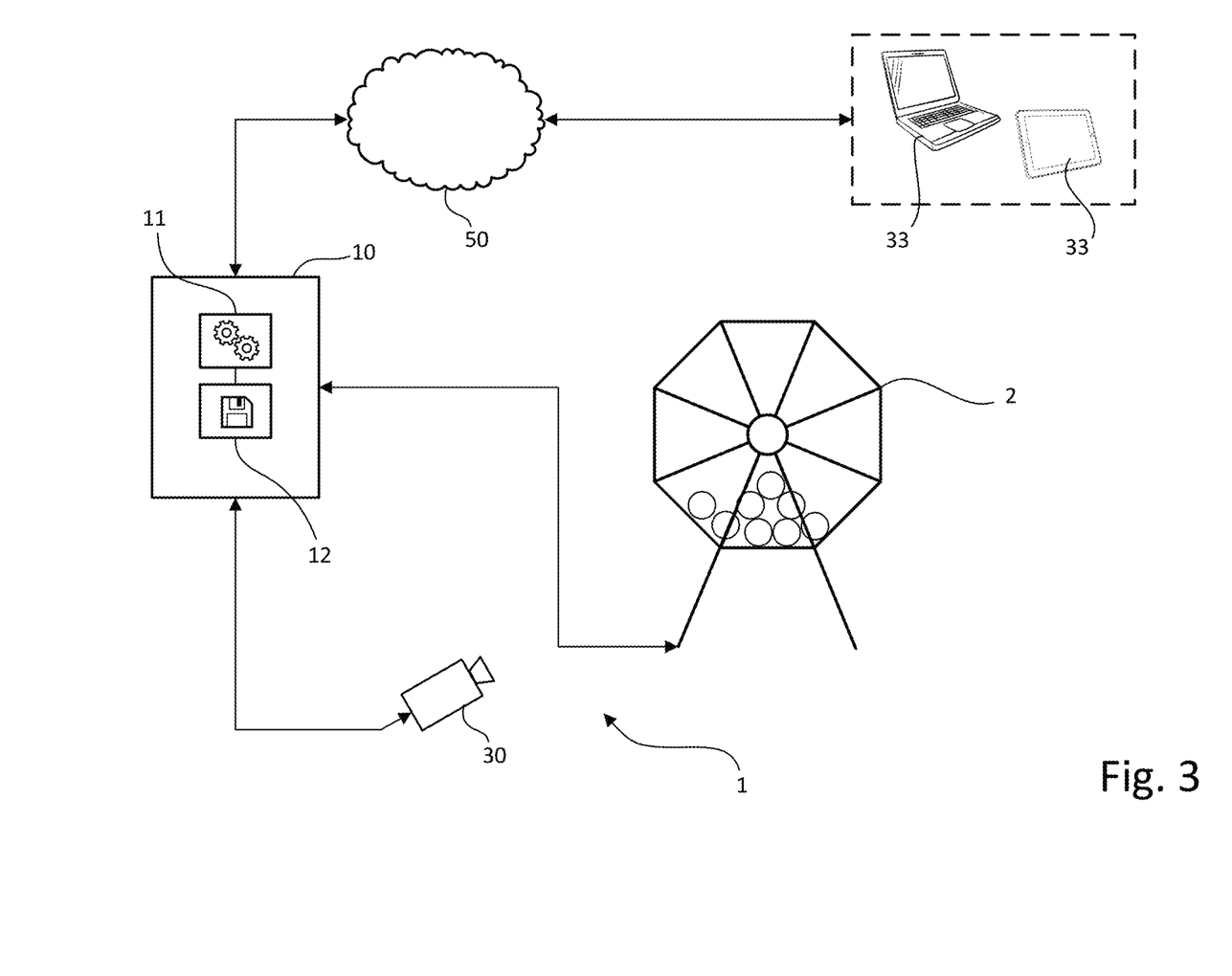
FIG. 3 is a schematic block diagram representation of a system for controlling a graphical user interface in a live-casino environment in accordance with an embodiment of the present disclosure.

FIG. 3 is a schematic block diagram representation of a system 1 for controlling and adapting a user interface based on events during a casino game such as a bingo-game. The bingo-game is preferably live-streamed to a plurality of user device 33 via an external network 50. The system 1 has a control device 10 operably connected to one or more cameras 30 facing the HRNG in the form of a bingo-machine 2, and to a plurality of user devices 33 via a network.

Further, the control device 10 includes control circuitry 11 (may also be referred to as one or more processors, or a control unit) and a memory 12. The control circuit 11 is configured to execute instructions stored in the memory 12 to perform a method for controlling an online gaming system according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. Furthermore, the control device 10 may further have a sensor interface and a communication interface (not shown) for communicating with peripheral entities or remote entities.

The control circuitry 11 is configured to obtain a signal indicative of an output of a Hardware Random Number Generator HRNG 2, here in the form of a bingo-machine 2. The signal may for example originate from an output-identifying apparatus associated with the bingo-machine, or any other suitable device configured to detect an integer value of a selected ball of the bingo-machine such as e.g. a camera 30 provided with appropriate image-recognition software. The output of the bingo-machine comprises a symbol (oftentimes provided on a ball) in the form of an integer value selected from a predefined set comprising a plurality M of unique integers (e.g. an integer value selected from the range 1-75). The bingo-machine 2 is configured to output one random integer from the predefined set M for each launch of the bingo-machine. As the skilled person in the art readily understands, the bingo-machine 2 is configured to output a specific value only once during a game.

Further, the control circuitry 11 is configured to provide a graphical user interface on a display of a remote electronic device 33. The graphical user interface comprises a live video stream (may also be referred to as a live video feed) indicative of at least the output of the bingo-machine 2. The live video stream may for example be provided by means of one or more cameras 30 arranged to monitor the bingo-machine 2. The graphical representation further comprises a graphical elements where each graphical elements comprises/defines a virtual card. Various details and example embodiments related to the virtual cards have already been discussed in the foregoing and are therefore omitted for the sake of brevity and conciseness. The skilled reader readily understands how to apply the above-discussed features in relation to the illustrated system 1.

The control circuitry 11 is further configured to, for each launch/round of the bingo-machine 2, identify the number output by the bingo-machine. The integer value of the output may for example be provided directly by the bingo-machine, the camera 30 or any other suitable means for identifying the symbol of the output. Furthermore, the control circuitry 11 is configured to determine a virtual card score for each virtual card of the plurality of virtual cards based on the identified number, and to update the graphical representation. In more detail, the control circuitry is configured to mark the identified number on each virtual card having that number, and to re-arrange the layout of the plurality of virtual cards based on the determined virtual card score so to emphasise the virtual card having the highest determined virtual card score relative to at least one other virtual card of the plurality of cards.

As stated above, the details related to the virtual card score and re-arrangement of the layout of the cards based on the calculated score have already been discussed and exemplified in the foregoing and will for the sake of brevity and conciseness not be repeated.

In summary, the present disclosure provides means for identifying potential symbols (e.g. numbers) which are last in any potential winning line (i.e. row, column or diagonal) on any card, and merging all of the identified potential which pertain to the same type of line (i.e. the same associated potential pay-out). Moreover, means for calculating potential winnings for each potential symbol is provided by summing up all winnings for a specific potential symbol on each card based on a pre-defined pay-out scheme (i.e. the more winning lines a card has, the bigger the pay-out), and to add winnings, which are already won from other cards.

Thus, the embodiments proposed herein provides players with the possibility to see "high potential" numbers in the game user-interface which provides for an improved user experience during game play since a user can more easily follow the most important events during the game, such as the paying attention to the most important virtual cards (i.e. virtual cards which have a higher chance of winning at the next draw/launch).

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a processing system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A method, comprising:
obtaining a signal indicative of an output of a Hardware Random Number Generator, HRNG, the output of the HRNG comprising a symbol within a predefined set comprising a plurality M of unique symbols, wherein the HRNG is configured to output one random symbol from the predefined set for each launch of the HRNG;
providing a graphical user interface on a display of a remote electronic device, the graphical user interface comprising:
a graphical representation comprising:
a live video stream of at least the output of the HRNG;
a plurality of graphical elements, each graphical element defining a virtual card,
wherein each virtual card has an N×N matrix of randomly arranged unique symbols, wherein the symbols of each virtual card form a subset S of the symbols of the predefined set, wherein a number of elements in the subset S is smaller than a number of elements in the predefined set M;
wherein the method further comprises, for each launch of the HRNG:
identifying the symbol of the output of the HRNG;
determining a virtual card score for each virtual card of the plurality of virtual cards based on the identified symbol;
updating the graphical representation by:
for each virtual card comprising the identified symbol, marking the identified symbol;
re-arranging a layout of the plurality of virtual cards based on the determined virtual card score so to emphasize the virtual card having the highest determined virtual card score.

2. The method according to claim 1, wherein the step of determining a virtual card score comprises:
- determining a number of un-marked symbols in each column, in each row, and in each diagonal for each virtual card;
- determining the virtual card score for each virtual card based on the determined number of un-marked symbols, wherein a lower number of un-marked symbols renders in a higher virtual card score.

3. The method according to claim 1, wherein the step of determining a virtual card score comprises:
- identifying any virtual card of the plurality of virtual cards having only one symbol remaining in order to form a full column, a full row, or a full diagonal of marked symbols, wherein each column, row, or diagonal having only one symbol left in order to form a full column, a full row, or a full diagonal of marked symbols is defined as a potential scoring line;
- determining the virtual card score for the plurality of virtual cards based on a number of potential scoring lines, where a higher number of potential scoring lines renders in a higher virtual card score.

4. The method according to claim 3, wherein the step of updating the graphical representation further comprises:
- for each identified virtual card having only one symbol remaining in order to form a full column, a full row, or a full diagonal of marked symbols, marking the un-marked symbol in each potential scoring line;
- wherein the marking of the un-marked symbol in each potential scoring line is different than the marking of the identified symbol.

5. The method according to claim 1, wherein the step of determining a virtual card score comprises:
- determining a total number of full columns, full rows, and full diagonals of marked symbols for each virtual card;
- determining the virtual card score for each virtual card based on the determined total number of full columns, full rows, and full diagonals of marked symbols, wherein a higher total number of full columns, full rows, and full diagonals of marked symbols, renders in a higher virtual card score.

6. The method according to claim 1, further comprising, for each launch of the HRNG:
- identifying each potential symbol for the plurality of virtual cards, wherein each potential symbol is defined as a single symbol remaining for any virtual card of the plurality of virtual cards to form a full column, a full row, or a full diagonal of marked symbols;
- wherein the graphical representation further comprises:
  - at least one graphical element comprising information about the identified potential symbol(s).

7. The method according to claim 6, further comprising, for each launch of the HRNG:
- calculating a number of occurrences of each identified potential symbol in the plurality of virtual cards;
- calculating a pay-out associated with each identified potential symbol based on the number of occurrences of each identified potential symbol and a predefined pay-out scheme;
- wherein the at least one graphical element comprising information about the identified potential symbol(s) further comprises information about the pay-out associated with each identified potential symbol; and
- wherein the step of updating the graphical representation further comprises:
  - grouping the at least one graphical element comprising information about the identified potential symbol(s) based on the calculated pay-out associated with each identified potential symbol.

8. The method according to claim 1, wherein the plurality of graphical elements defining, each defining a virtual card comprises at least twelve graphical elements each defining a virtual card.

9. A non-transitory computer-readable storage medium storing one or more programs configured to be executed by one or more processors of a processing system, the one or more programs comprising instructions for performing the method according to claim 1.

10. A system, comprising control circuitry configured to:
- obtain a signal indicative of an output of a Hardware Random Number Generator, HRNG, the output of the HRNG comprising a symbol within a predefined set comprising a plurality M of unique symbols, wherein the HRNG is configured to output one random symbol from the predefined set for each launch of the HRNG;
- provide a graphical user interface on a display of a remote electronic device, the graphical user interface comprising:
  - a graphical representation comprising:
    - a live video stream of at least the output of the HRNG;
    - a plurality of graphical elements, each graphical element defining a virtual card,
    - wherein each virtual card has an N×N matrix of randomly arranged unique symbols, wherein the symbols of each virtual card form a subset S of the symbols of the predefined set, wherein a number of elements in the subset S is smaller than a number of elements in the predefined set M;
- wherein the control circuitry is further configured to, for each launch of the HRNG:
  - identify the symbol of the output of the HRNG;
  - determine a virtual card score for each virtual card of the plurality of virtual cards based on the identified symbol;
  - update the graphical representation by:
    - for each virtual card comprising the identified symbol, marking the identified symbol;
    - re-arranging a layout of the plurality of virtual cards based on the determined virtual card score so to emphasise the virtual card having the highest determined virtual card score.

11. The system according to claim 10, wherein the step of determining a virtual card score comprises:
- determining a number of un-marked symbols in each column, in each row, and in each diagonal for each virtual card;
- determining the virtual card score for each virtual card based on the determined number of un-marked symbols, wherein a lower number of un-marked symbols renders in a higher virtual card score.

12. The system according to claim 10, wherein the step of determining a virtual card score comprises:
- identifying any virtual card of the plurality of virtual cards having only one symbol remaining in order to form a full column, a full row, or a full diagonal of marked symbols, wherein each column, row, or diagonal having only one symbol left in order to form a full column, a full row, or a full diagonal of marked symbols is defined as a potential scoring line;
- determining the virtual card score for the plurality of virtual cards based on a number of potential scoring lines, where a higher number of potential scoring lines renders in a higher virtual card score.

13. The system according to claim 10, wherein the step of determining a virtual card score comprises:
- determining a total number of full columns, full rows, and full diagonals of marked symbols for each virtual card;
- determining the virtual card score for each virtual card based on the determined total number of full columns, full rows, and full diagonals of marked symbols, wherein a higher total number of full columns, full rows, and full diagonals of marked symbols, renders in a higher virtual card score.

14. The system according to claim 10, wherein the control circuitry is further configured to, for each launch of the HRNG:
- identify each potential symbol for the plurality of virtual cards, wherein each potential symbol is defined as a single symbol remaining for any virtual card of the plurality of virtual cards to form a full column, a full row, or a full diagonal of marked symbols;
- wherein the graphical representation further comprises:
  - at least one graphical element comprising information about the identified potential symbol(s).

15. The system according to claim 14, wherein the control circuitry is further configured to, for each launch of the HRNG:
- calculate a number of occurrences of each identified potential symbol in the plurality of virtual cards;
- calculate a pay-out associated with each identified potential symbol based on the number of occurrences of each identified potential symbol and a predefined pay-out scheme;
- wherein the at least one graphical element comprising information about the identified potential symbol(s) further comprises information about the pay-out associated with each identified potential symbol; and
- wherein the step of updating the graphical representation further comprises:
- grouping the at least one graphical element comprising information about the identified potential symbol(s) based on the calculated pay-out associated with each identified potential symbol.

* * * * *